(No Model.) 11 Sheets—Sheet 2.

W. TAYLOR.
WIRE NAIL MACHINE.

No. 352,164. Patented Nov. 9, 1886.

Fig. 2.

WITNESSES
Geo. H. Harvey
A. H. Price

INVENTOR
William Taylor
By Josiah W. Ells
Attorney (No Model.) 11 Sheets—Sheet 6.

W. TAYLOR.
WIRE NAIL MACHINE.

No. 352,164. Patented Nov. 9, 1886.

WITNESSES

INVENTOR
William Taylor
Josiah W. Ells
Attorney (No Model.)  11 Sheets—Sheet 7.

W. TAYLOR.
WIRE NAIL MACHINE.

No. 352,164.  Patented Nov. 9, 1886.

WITNESSES  INVENTOR
Geo. H. Harvey  William Taylor
A. H. Price  By Josiah W. Ells
  Attorney N. PETERS, Photo-Lithographer, Washington, D. C.

(No Model.) 11 Sheets—Sheet 8.

W. TAYLOR.
WIRE NAIL MACHINE.

No. 352,164. Patented Nov. 9, 1886.

WITNESSES

INVENTOR
William Taylor
By Josiah W. Ells
Attorney (No Model.)　　　　　　　　　　　　　　　　11 Sheets—Sheet 9.
W. TAYLOR.
WIRE NAIL MACHINE.

No. 352,164.　　　　　　　　　　Patented Nov. 9, 1886.

WITNESSES　　　　　　　　　　　　　　　INVENTOR
Geo. H. Harvey　　　　　　　　　　　William Taylor
A. H. Price　　　　　　　　　　　By Josiah W. Ells
　　　　　　　　　　　　　　　　　　　　Attorney (No Model.)

W. TAYLOR.
WIRE NAIL MACHINE.

No. 352,164. Patented Nov. 9, 1886.

WITNESSES
Geo. H. Harvey
A. H. Price

INVENTOR
William Taylor
By Josiah W. Ells
Attorney

UNITED STATES PATENT OFFICE.

WILLIAM TAYLOR, OF ALLEGHENY, ASSIGNOR TO PARSHALL D. NICOLS, OF SEWICKLEY, PENNSYLVANIA.

WIRE-NAIL MACHINE.

SPECIFICATION forming part of Letters Patent No. 352,164, dated November 9, 1886.

Application filed December 4, 1885. Serial No. 184,751. (No model.)

*To all whom it may concern:*

Be it known that I, WILLIAM TAYLOR, a citizen of Great Britain, residing at Allegheny city, in the county of Allegheny and State of Pennsylvania, have invented a new and useful improvement in that class of machines used in making nails from wire, wherein it is fed into the machine by an intermittent movement, and firmly held while having a head formed thereon, then thrust forward a requisite distance, pointed, and separated from the wire preparatory to the formation of a subsequent nail, of which the following is a specification.

The first part of my invention consists in the combination, with a wire-nail-making machine, of a novel device for taking the kinks and bends out of the wire before it is closed upon by the gripping-dies, whereby the body of the nail formed therefrom will be delivered in a perfectly-straight condition.

The second part of my invention relates to the means employed for producing a series of shallow nicks or serrations in the wire preparatory to being acted upon by the gripping-dies and heading-ram.

The third part of my invention consists of a feeding device capable of being adjusted to move the wire into the machine in such a manner as to make nails of different lengths without change or alteration of dies.

The fourth part of my invention consists of a heading-ram provided with a movable nose or heading-punch capable of being adjusted to strike the end of the wire on a direct line with its axis, or at a slight angle thereto, for the purpose of making the head of the nail properly conform to its body without interference or special adjustment of the gripping-dies.

The fifth part of my invention consists of a movable box or arm carrying one or more knives affixed therein or thereto, and adapted to be readily adjusted to properly point the nail and sever the same from the wire at any predetermined distance from the gripping-dies, whereby the length of wire designed for the head of the nail may be increased or diminished to suit the character or sort of nail it is intended to make.

The sixth part of my invention relates to the pointing tools or knives, which in this case consist of an assemblage of several pieces so shaped as that when properly arranged with respect to each other they will constitute the best known form of pointing and cutting-off tools adapted to a wire nail machine, and which may be easily disengaged therefrom and each piece separately sharpened by means of an ordinary grinding-stone, or otherwise.

The seventh part of my invention consists of a lever provided with an adjustable and detachable end or finger adapted to knock off such nails from the wire as remain incompletely severed therefrom by the imperfect action of the pointing-knives.

The eighth part of my invention consists in providing the spring used for driving the ram against the wire with a non-metallic elastic cushion at both ends, whereby the repeated action of the ram is prevented from crystallizing and weakening the spring, and also for the purpose of deadening such noise as would otherwise be produced in a machine not provided with cushions.

That others may understand the nature of my invention and an embodiment of the same in substantial form, I will endeavor to describe it by reference to the accompanying drawings, wherein—

Fig. 28 represents a sliding frame carrying a pair of grooved feed-rolls, each provided with a ratchet-wheel attached to its journal, operating in conjunction with a pawl and spring to prevent the rolls from rolling over the surface of the wire in their forward movement; also, Fig. 29, a side view of one of the ratchet-wheels, together with its pawl and spring.

To construct my wire-nail-making machine I prepare a substantial frame, 1, and provide the same with such bearings and guideways as may be considered essential for the reception and proper support of the moving parts. Across this frame 1 is arranged the main driving-shaft 2, on one of the projecting ends of which are placed, side by side, a fast and loose pulley, 3 and 4, by means of which power may be communicated to the shaft through the medium of an endless belt, and to steady the revolutions of the shaft and operations of the machine a balance fly-wheel, 5, is made fast on the shaft beside the aforementioned pulleys. Located on the extreme opposite end of the main shaft 2, and rigidly secured thereto, is a thick circular disk, 6, carrying a projecting wrist-pin, 7, made adjustable eccentrically with respect to the axis of the main shaft, whereby the wrist is given a crank-like movement, the stroke of which may be varied and regulated to suit the requirements of the case. This wrist-pin 7 engages with one end of a long horizontally-arranged connecting-rod, 8, its other end being attached by a ball-and-socket joint, 9, to the extremity of a pivoted arm, 10, adapted to vibrate on a stationary pin, 11, supported by a projecting bracket, 12, affixed to the frame of the machine, so that the pivoted arm 10 may move back and forth in the arc of a circle. That end of the arm farthest from its pivotal pin 11 is arranged between a short vertical post, 13, and small block 14, made adjustable toward or from the post by means of a regulating-screw, 15, so that the arm in its vibratory action will strike first one and then the other, causing them to move in unison therewith, the length of such movement being governed entirely by the distance the block 14 may be from the post 13, and as both are attached to a small sliding tablet, 16, it is correspondingly moved back and forth within suitable guideways to the same extent. Forming part of this tablet 16 is a small vertical frame, 17, in which are arranged, one above the other, two circumferentially-grooved rolls, 18, each serrated in such a manner as to produce a series of transverse nicks in a wire passing between them, the necessary pressure of the rolls thereon being effected by a screw, 19, in the upper portion of their supporting-frame 17; and each roll 18 is provided with a small ratchet-wheel adapted to operate, in conjunction with a suitable pawl and spring, to prevent the rolls from rolling over the surface of the wire on their forward movement. Behind these nicking-rolls 18 is a stationary box, 20, rigidly fixed to the frame of the machine, in which are arranged two horizontally-grooved bars, 21, between which the wire is entered and drawn through in such a manner as to straighten the same on its way into the machine; and these straightening-bars 21, being square in cross-section, may be grooved on each of their four sides, whereby they are made reversible and adapted to wires of different diameters. These longitudinally-grooved straightening-bars 21 are firmly and rigidly held in their box 20 and pressed the one upon the other by means of suitable pinch-screws, 22, so arranged as to effect that purpose. After the end of the wire has passed through or between the straightening-bars 21 it will be caught by the nicking-rolls 18, which, by a reciprocating action in connection with the tablet 16, will cause them to draw the wire and advance it toward and through a guide, 23, leading to the gripping-dies, which in this case are arranged vertically one above the other within a suitably-strong portion of the main frame 1, the upper gripping-die, 24, being made adjustable by means of a screw and corresponding nut, 25, while the lower gripping-die, 26, is longer and in like manner made adjustable by a similar screw and nut, 27, that connects it with a lever, 28, near that end pivoted to the frame of the machine, its other or free end being extended up through an opening in said frame and by sundry bends brought over the main shaft 2, that is fitted with a suitable cam, 29, to operate the same. This end of the lever 28 is provided with a small anti-friction roller, 30, after the manner usual in such cases, so that on each revolution of the shaft 2 and cam 29 the lever will correspondingly rise and the gripping-die 26 attached thereto be moved upward to seize and firmly hold the wire during the heading operation, then released for an additional forward movement by the action of the feeding device hereinbefore set forth.

The means employed for forming the heads on the nails comprise a stout iron bar, 31, or heading-ram arranged horizontally and lengthwise of the machine, and in substantial bearings, one of which is at or near the middle and the other the rear end of the main frame 1, and in these bearings it is made to slide endwise with a reciprocating movement on a line with the feeding and gripping dies or the wire passing through them, and the end of this sliding ram 31 nearest thereto is provided with a steel punch, 32, made detachable or adjustable therein by means of suitable transverse set-screws, 33, whereby the said punch may be arranged to strike the end of the protruding wire, either on a straight line therewith or at a slight angle thereto, so that nails having heads of different shapes may be made without changing any other portion of the machine, or otherwise, as the case may require. The end of this ram 31 most remote from its heading-punch 32 passes through a stationary cross bar or yoke, 34, held in place by two separate and parallel rods, 35, each of which is provided with a suitable screw and nut, 36. Around that portion of the heading-ram between its cross-yoke 34 and the main frame 1 is coiled a powerful spring, 37, and the object of the nuts 36 on the ends of the parallel rods 35 is to adjust the tension of this spring.

Figure 1:
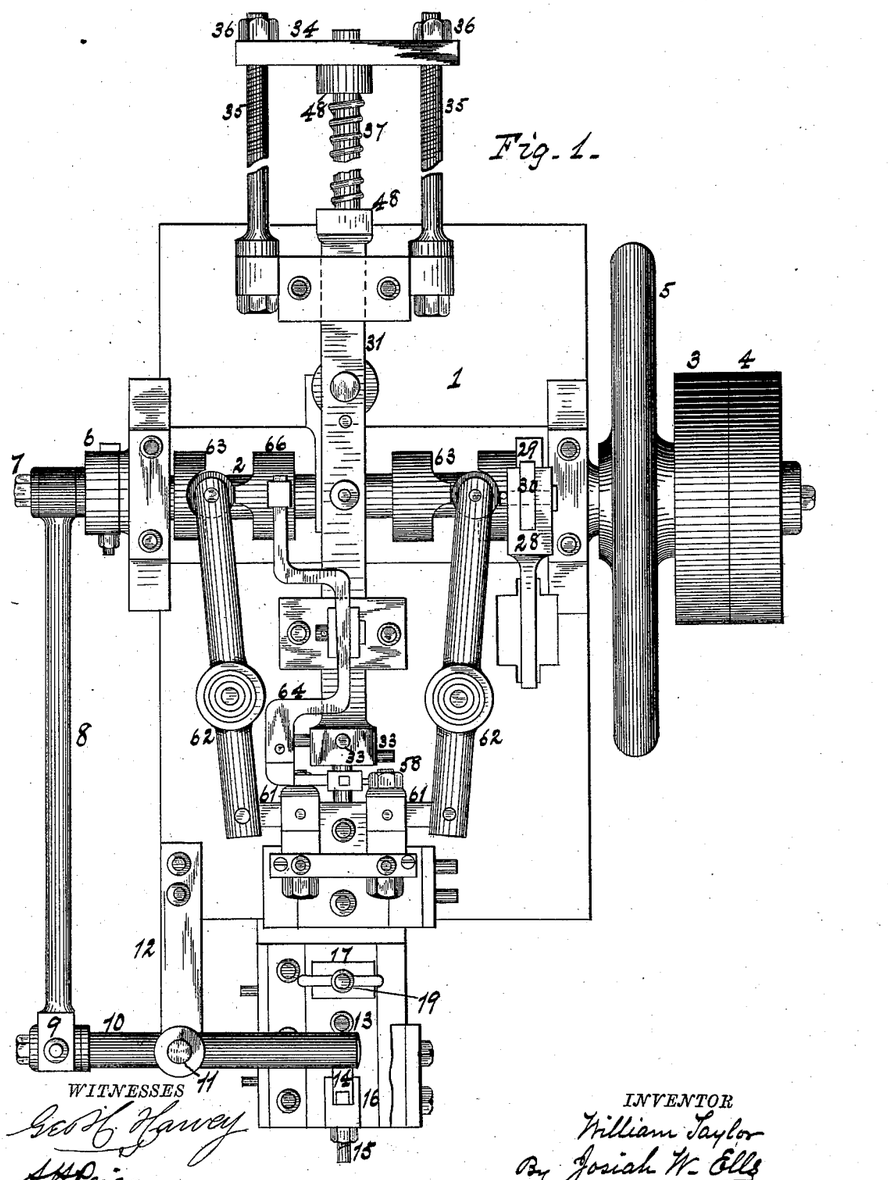
Figure 1 represents a top view or plan of my improved wire-nail machine.
Figure 2:
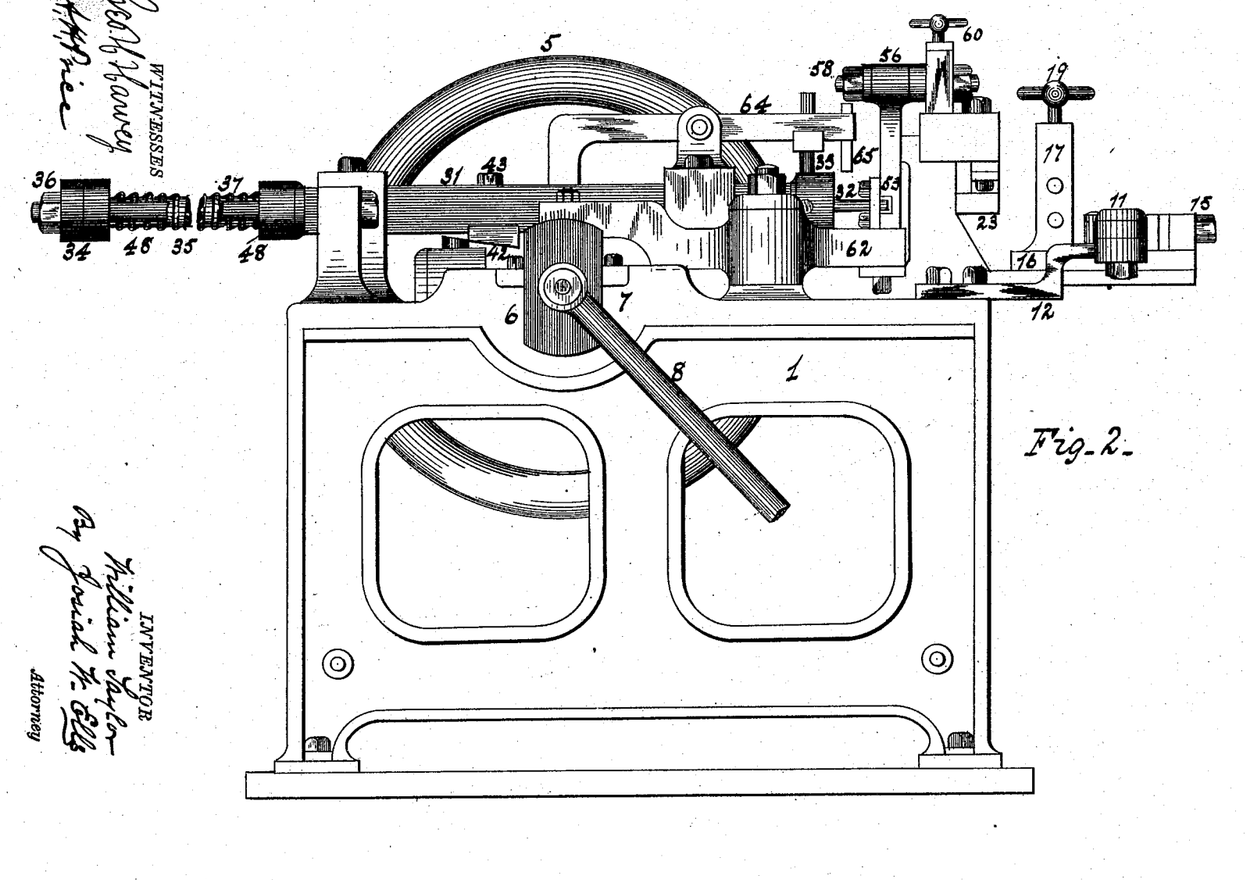
Fig. 2, a side elevation of the same, wherein the connecting-rod of the feeding device is broken off and dropped down to prevent an obstruction of the view.
Figure 3:
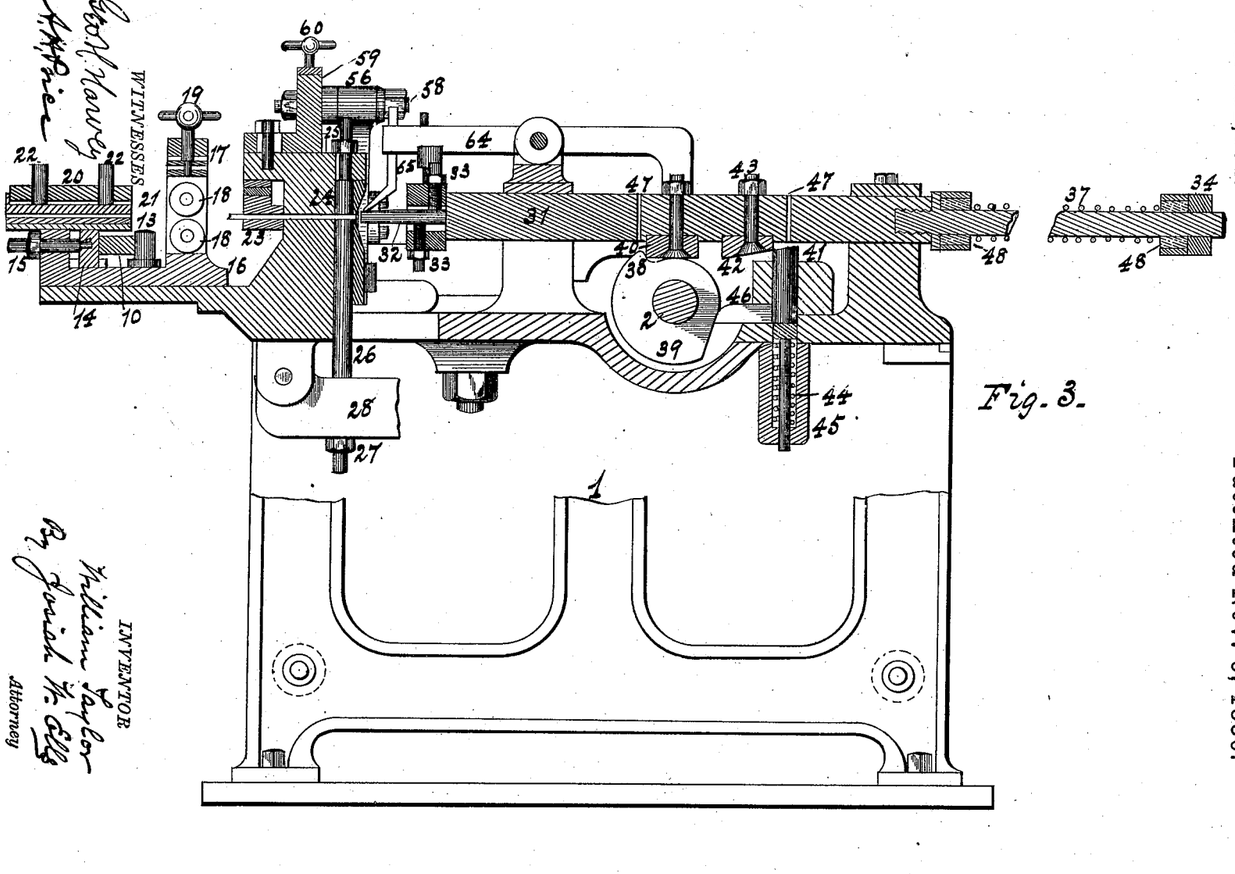
Fig. 3, a longitudinal vertical section of the entire machine.
Figure 4:
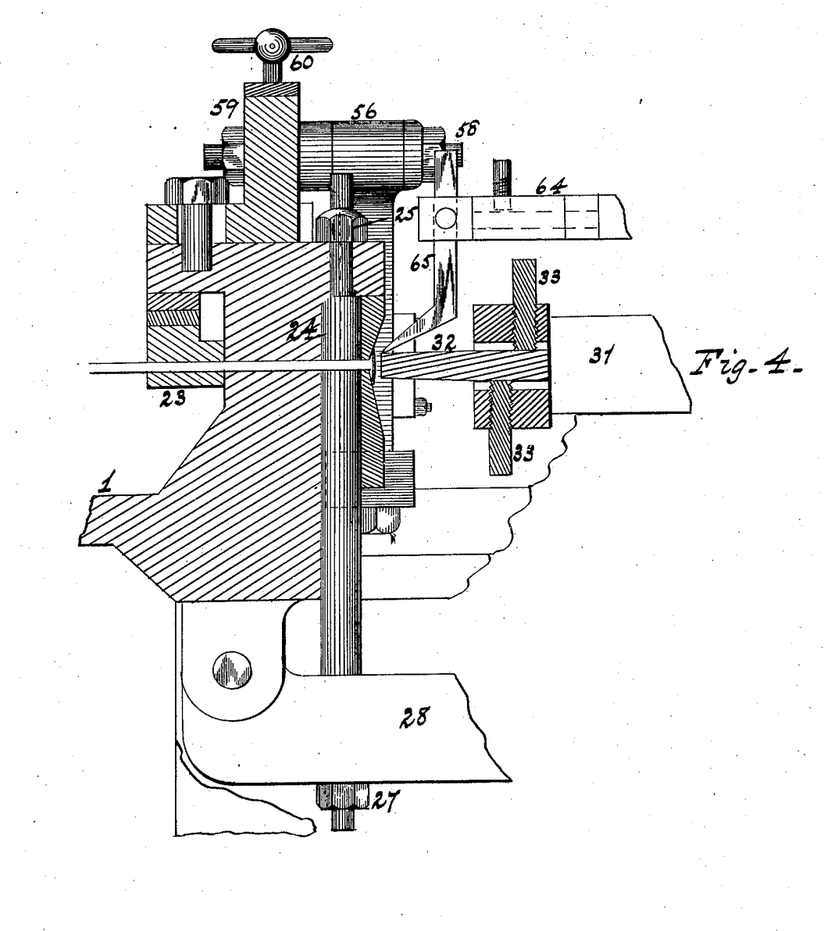
Fig. 4, an enlarged sectional view of the gripping-dies, a portion of the heading-ram, the device for knocking off the finished nails, together with other parts arranged near the gripping-dies.
Figure 5:
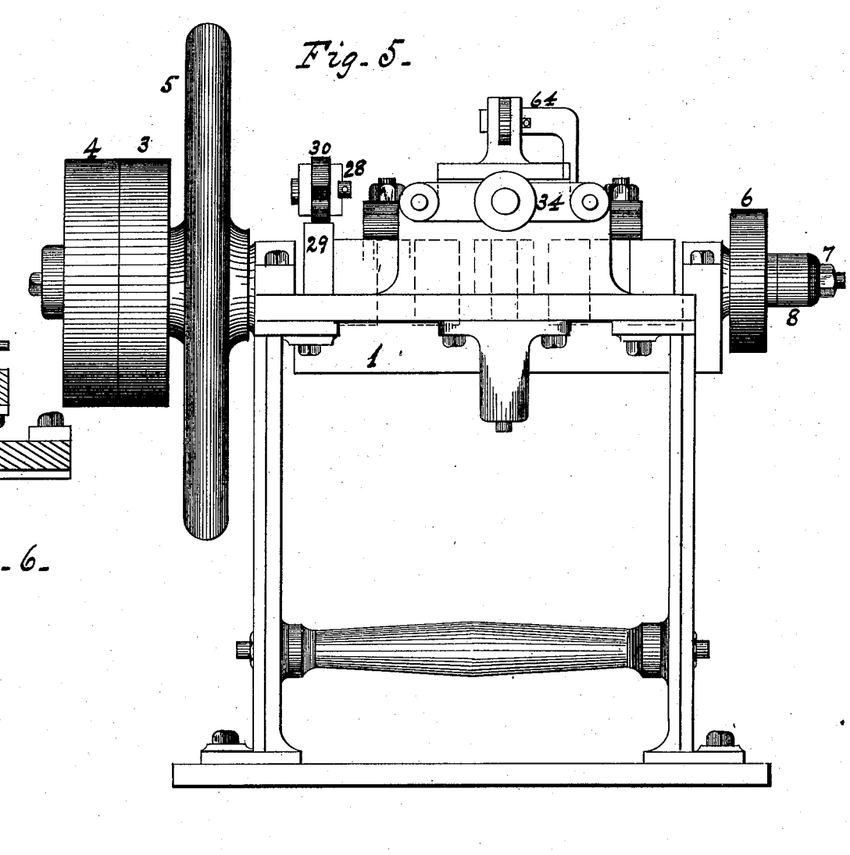
Fig. 5 represents the rear end of the machine.
Figure 6:
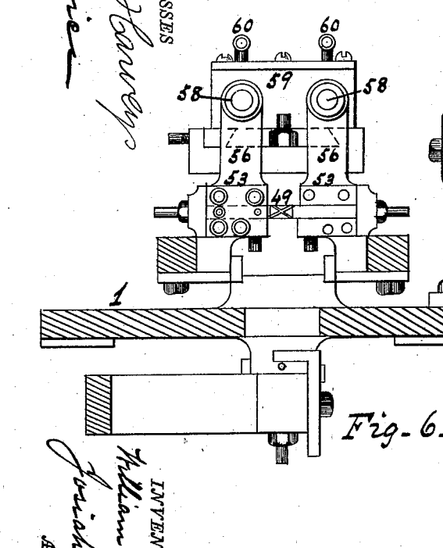
Fig. 6, a vertical transverse section of that part of the machine immediately in front of the arms carrying the pointing-tools which are affixed therein.
Figures 7, 8, 9:
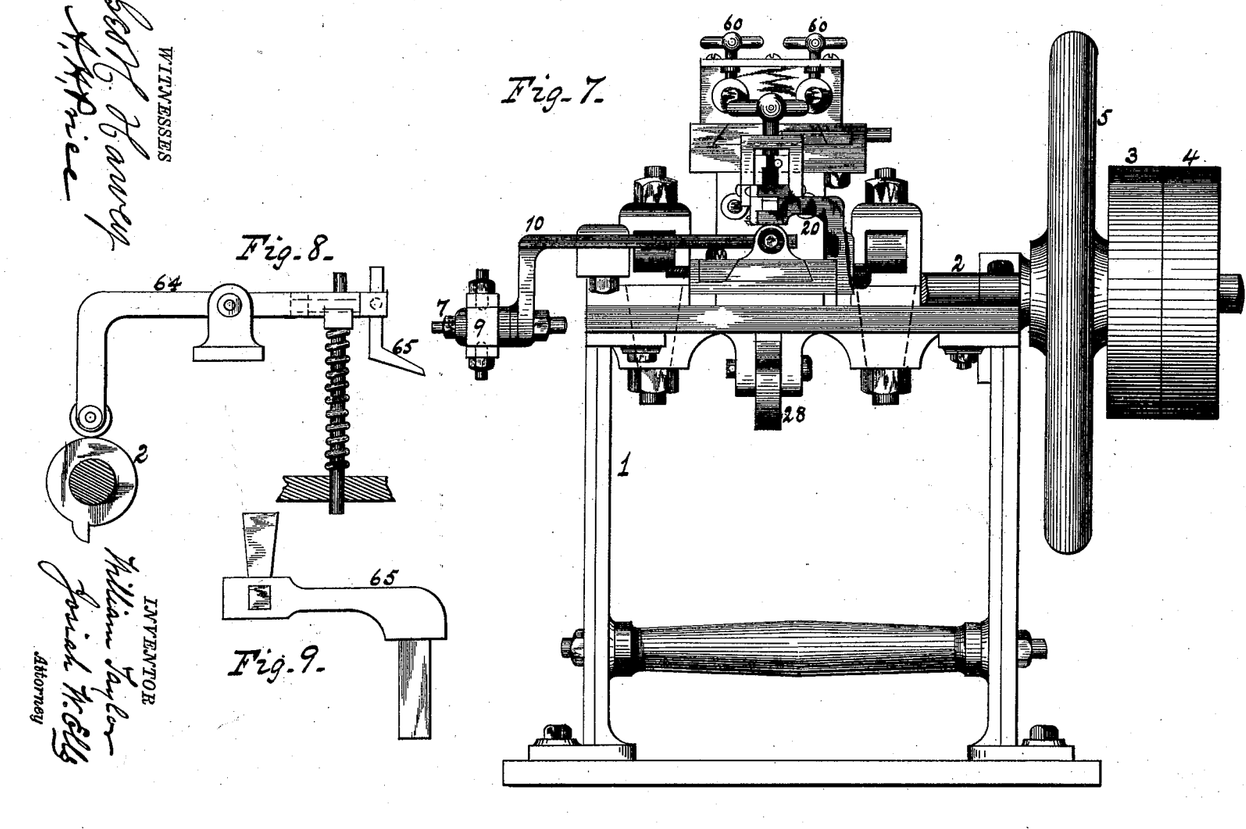
Fig. 7, an elevation of the front or feed end of the machine.
Fig. 8, an enlarged view of the knocking-off device and operative parts as seen when detached from the machine.
Fig. 9 represents a top view of the finger in the forward end of the knocking-off lever.
Figures 10, 11, 12, 13, 14, 15, 16, 17, 18, 19, 20:
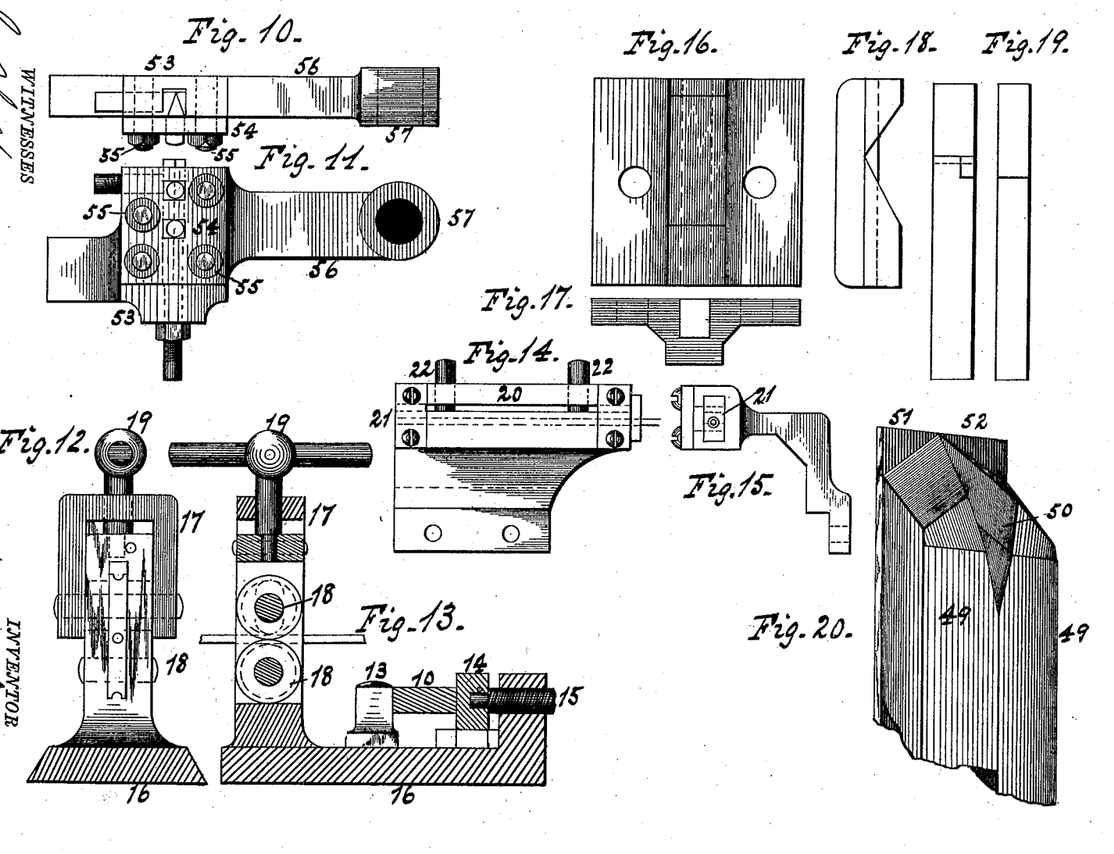
Fig. 10 represents an edge view of one of the arms used for carrying the pointing-tools.
Fig. 11, a front view of the same.
Fig. 12, a front elevation of the device used for serrating or nicking the wire by means of toothed rolls.
Fig. 13, a longitudinal section of the same, together with the feed adjustment.
Fig. 14, a side elevation of the wire-straightening device.
Fig. 15, an end view of the same.
Fig. 16, a front view of cap over the straightening-dies.
Fig. 17, an end view of same.
Fig. 18, a side view of said cap.
Fig. 19, an edge and side view of the gripping-dies.
Fig. 20, an enlarged perspective view of the cutting ends of the pointing-tools.
Figure 21:
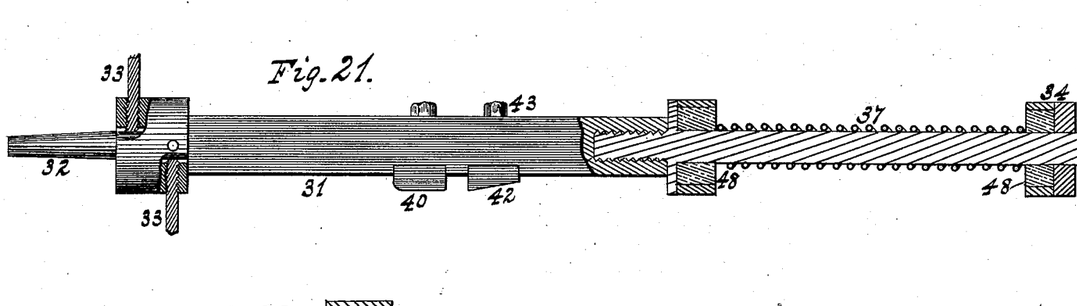
Fig. 21, a longitudinal view of the heading-ram and its actuating-spring partly in section.
Figure 22:
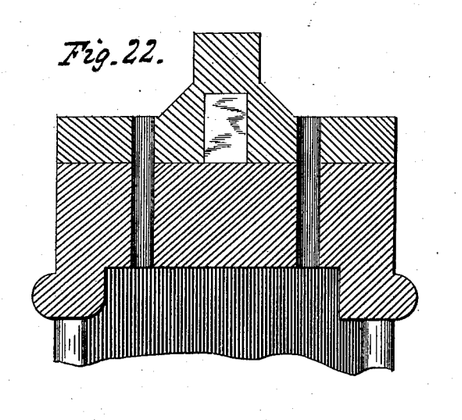
Fig. 22, a transverse section of die-box.
Figure 23:
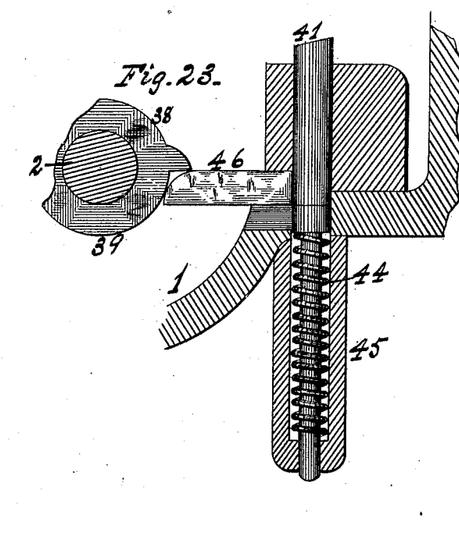
Fig. 23, a sectional view of the dog used in holding back the heading-ram, together with the means for operating the same.
Figure 24:
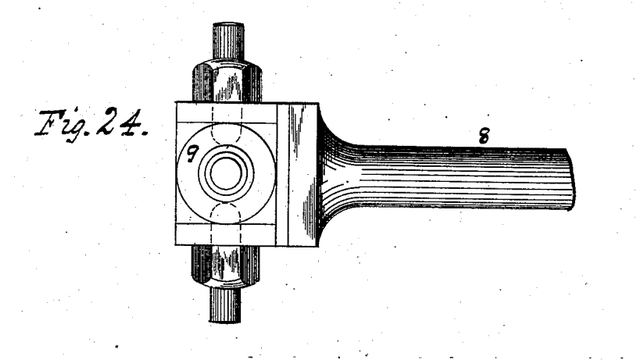
Fig. 24, a portion of connecting-rod with ball-joint therein for properly operating the feeding mechanism.
Figure 25:
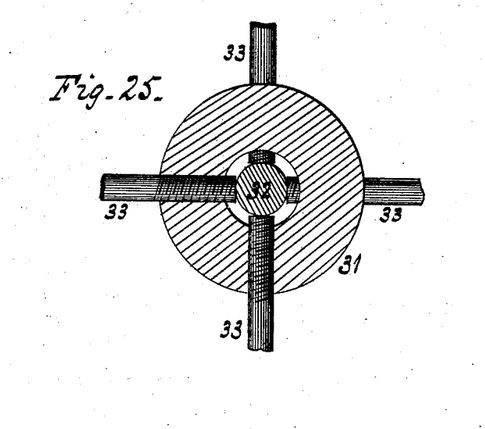
Fig. 25, a transverse section of that end of the ram carrying an adjustable heading-punch.
Figure 26:
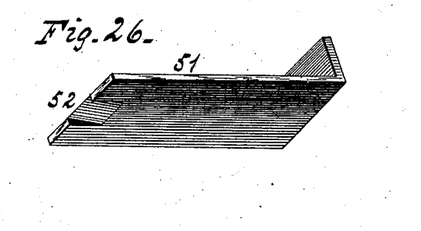
Fig. 26, a detached perspective view of a cutter used in combination with the angular-edged pointing-tools.
Figure 27:
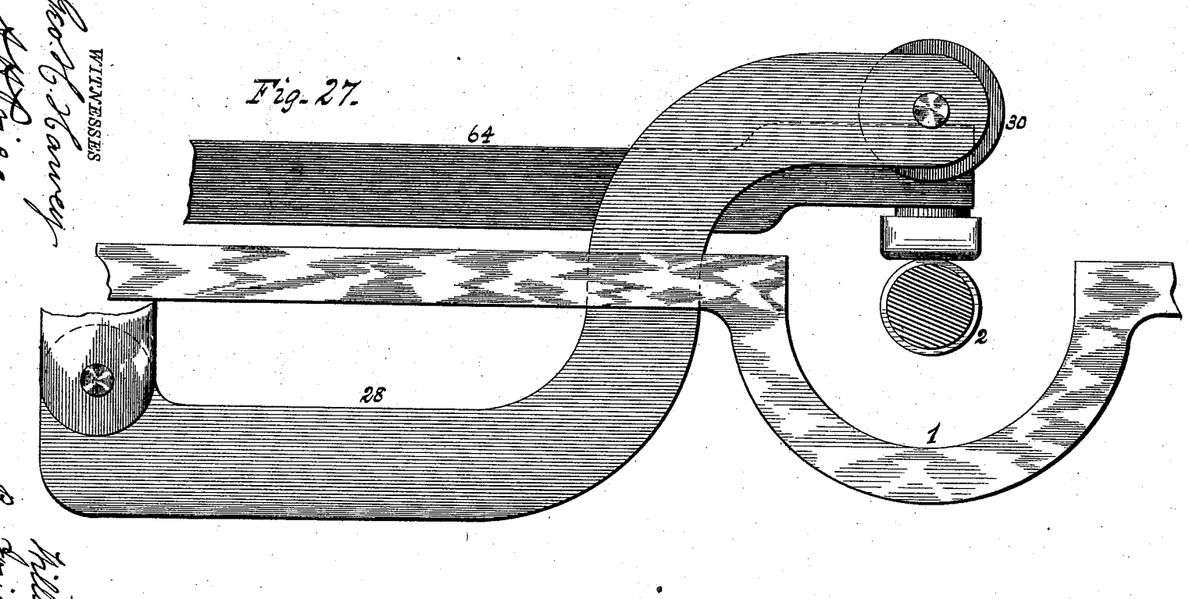
Fig. 27, an enlarged side view of a portion of cutting-off and gripping-die levers.
Figures 28, 29:
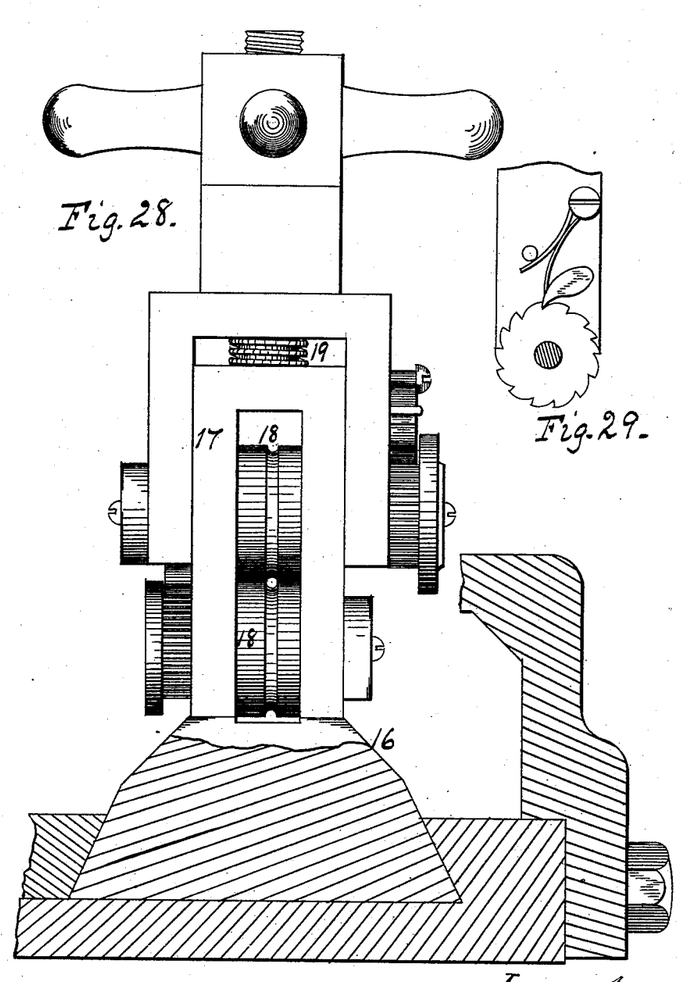

The heading-ram 31 is moved back endwise, so as to compress the spring 37 at a comparatively slow rate of speed by the toe 38 of a revolving cam, 39, on the main shaft acting against a lug, 40, on the under side of the heading-bar 31, and when this bar or ram has been moved back as far as this cam 39 can effect it, there it is held by a strong dog-bolt, 41, shot upward through the frame behind an inclined block, 42, attached to the ram by means of a suitable bolt, 43, the upward movement of the dog being effected by a spiral spring, 44, inclosed in a case, 45, about its lower portion. This dog 41 is also provided with a stout arm, 46, projecting outwardly therefrom toward the aforesaid cam 39, so that its toe shall come in contact therewith at the proper time and press the dog down to the extent of releasing the ram, which, by means of its powerful spring 37, will be thrown forward with sufficient force to properly head the wire, and which operation will be repeated at each revolution of the main shaft. Vertical holes 47 extend through the ram for oiling the operative parts underneath. At each end of the large spring 37, used to actuate the ram 31, is an elastic cushion, 48, of such non-metallic material as will serve to deaden sound and ease the parts from vibratory shock incident thereto. In this machine the points of the nails are formed by cutting them in an oblique direction to the line of the wire; and the tools used for this purpose consist of an assemblage of pieces, each tool being composed of three parts held firmly together within a suitable box by the use of a sufficient number of screws. Fig. 20 of the drawings delineates the shape of these tools and the relative position of each when properly placed together. By reference thereto it will be seen that two of them consist of short bars of steel, 49, ground at one end to a chisel-edge, so beveled from both sides as that when the bars are placed side by side, as shown, the sharp edge of each will meet the other at one end and form between them from that point outward a V-shaped or acute angular space, 50, open at its opposite end. The angularity of the cutting-edges and the taper thereof will determine the form of point required for the proposed nail. Just behind these angular edged tools 49, and closely connected therewith, is a cutting-off knife, 51, fully shown in the perspective view 26, and is simply a flat plate of steel provided with a chisel-like edge, 52, about the middle of one end of the said plate, so as to leave the other parts thick or blunt and prevent its sharp edge from coming in contact with the opposing or similar tool acting in conjunction therewith. These three described pieces, 49 51 49, when together, as shown, are secured in a box or clamp, 53, so that their cutting-edges shall project a short distance therefrom, being held in that position by a cap, 54, affixed thereon by a suitable number of screws, 55. As each machine requires two sets of these pointing-tools that shall meet, point, and sever the wire between them, and as the construction of one set is precisely like the other, and the clamping devices differ only in being right and left handed, a description of one is deemed sufficient for both.

The clamps 53, used for carrying the pointing and cutting-off tools, are each provided with a short extension or arm, 56, through the end of which is a hole, 57, by which each arm or clamp is hung or suspended from a suitable wrist, 58, that projects horizontally and outward from a movable head, 59, each wrist, with its suspended clamp and tools, being separately adjustable up or down by means of hand-screws 60, to bring the cutting-edges of each set opposite the other and on a line with the wire, so as to properly act thereon; and the head 59 is so dovetailed into the solid portion of the main frame 1 as to admit of being shifted to bring the suspended cutting-tools nearer to or farther from the gripping-dies, whereby the length of the nail may be increased or diminished, or a greater or less quantity of metal left for the formation of a nail-head preparatory to or during the operation of the heading-ram and without stopping the same or any part of the machine. Each clamp 53, carrying its respective set of pointing and cutting-off tools, is connected by a short link, 61, to one end of a pivoted lever, 62, whereby a suitable motion may be imparted to the cutters by means of a cam, 63, on the main shaft. Occasionally a nail will adhere to the end of the wire by a very thin tenure and requires to be knocked off. To break this connection and free the nail, a crooked lever, 64, is used, having its fulcrum above the heading-ram, and this lever is provided with a bent steel finger, 65, that occupies a position directly in the pathway of the newly-made nails. One end of this lever 64 is arranged over the main shaft, so as to be acted upon by a suitable cam, 66, which at the proper moment will depress the finger end and free the finished nail. The steel finger 65, attached to the knocking-off lever 64, is easily detachable therefrom and capable of being adjusted to or from the gripping-dies, or up and down or sidewise to bring its operative end in proper position to accomplish the object or purposes required.

The several parts of this machine having been properly adjusted and set in motion, its operation is as follows: A wire suitable for conversion into nails is to have one end thrust through the groove between the straightening-bars 21 and onward between the serrated rolls 18, which by an advance movement will carry the wire forward to the grippers, that in turn will close upon it with a firm grip, whereupon the rolls will return by a backward movement a distance equaling the length of a finished nail, and in this backward movement transversely nick the wire. At this instant the header will be released and shot forward by its powerful spring against that portion of the wire extending beyond the grippers with sufficient force to form a head thereon. As the heading-ram returns to its former position, the grippers open, that the feeding device may bring forward a fresh portion of the wire. Then the pointing-tools advance, and sever and point the headed nail. As these several movements of the machine take place with great rapidity and regularity, the wire is automatically fed in, headed, pointed, and knocked off in the form of finished nails with remarkable speed.

Having described the construction and operation of my wire-nail-making machine, I claim—

1. In a wire-nail-making machine, the combination consisting of a device adapted to feed the wire into the machine, a pair of dies for holding the wire during the operation of forming a head thereon, a spring-actuated ram, and heading-punch therein, made adjustable by means of suitable transverse set-screws, whereby said punch may be shifted laterally or sidewise within the end of the heading-ram to strike the protruding wire, either on a straight line therewith or at an angle thereto, or otherwise, as the case may require.

2. In a wire-nail-making machine, the combination consisting of a gripping-die adapted to seize and hold the wire during the operation of forming a head thereon, a spring-actuated ram for staving a head on the wire, a reciprocating block or tablet supporting and carrying with it a pair of serrated rolls that in the backward movement of the tablet will roll over the wire and nick the same, and in a reverse movement of the tablet will be prevented from rotating, whereby they simply grasp the wire and feed it forward toward the heading-ram, and a pair of stationary grooved bars between which the wire is drawn on its way to the machine.

3. In a wire-nail-making machine, the combination consisting of fixed and stationary grooved bars, through or between which the wire is drawn for the purpose of straightening the same, suitable means for feeding the wire into the machine, a pair of gripping-dies adapted to seize and hold the wire during the operation of forming a head thereon, a reciprocating ram for staving a head on the wire, and pointing-tools formed of two or more pieces held together within a suitable clamp or box.

4. In a nail-making machine, the combination consisting of a pivoted arm connected by a link to a crank or wrist attached to the main shaft, a feeding device made operable by the action of the free end of said arm, a screw and movable block by which the effect or stroke of the arm on the feeding mechanism may be regulated to increase or diminish the extent of feed, a pair of gripping-dies for seizing and holding the wire, a sliding ram for heading the same, and a separable tool for pointing the nails.

5. The combination consisting of an automatic wire-feeding device, a gripper for holding the wire during the operation of forming a head thereon, a sliding ram adapted to head the nails, and separable angular-edged tools for pointing the same.

WILLIAM TAYLOR.

Witnesses:
JOSIAH W. ELLS,
G. H. ENGLAND.